United States Patent
Wang et al.

(10) Patent No.: US 8,330,923 B2
(45) Date of Patent: *Dec. 11, 2012

(54) MULTI-DOMAIN LIQUID CRYSTAL DISPLAY

(75) Inventors: Wen-Chun Wang, Taichung (TW);
I-Fang Wang, Chang Hua (TW);
Ming-Chang Yu, Tai Chung (TW);
Ying-Cheng Tsai, Chia Yi County (TW)

(73) Assignee: Wintek Corporation, Taichung (TW)

( * ) Notice: Subject to any disclaimer, the term of this patent is extended or adjusted under 35 U.S.C. 154(b) by 1054 days.

This patent is subject to a terminal disclaimer.

(21) Appl. No.: 12/234,231

(22) Filed: Sep. 19, 2008

(65) Prior Publication Data

US 2009/0073368 A1 Mar. 19, 2009

(30) Foreign Application Priority Data

Sep. 19, 2007 (TW) ................................ 96134785 A (51) Int. Cl.
*G02F 1/1343* (2006.01)
(52) U.S. Cl. .......................................... 349/143; 345/87
(58) Field of Classification Search .......... 349/139–144; 345/87

See application file for complete search history.

(56) References Cited

U.S. PATENT DOCUMENTS

| | | | |
|---|---|---|---|
| 5,757,444 A | 5/1998 | Takemura et al. | |
| 5,808,706 A | 9/1998 | Bae | |
| 6,195,140 B1 | 2/2001 | Kubo et al. | |
| 6,294,876 B1 | 9/2001 | Ando et al. | |
| 6,654,090 B1 | 11/2003 | Kim et al. | |
| 6,678,027 B2 | 1/2004 | Park et al. | |
| 6,724,452 B1 | 4/2004 | Takeda et al. | |
| 6,839,104 B2 | 1/2005 | Taniguchi et al. | |
| 7,176,990 B2 | 2/2007 | Choi et al. | |
| 7,663,708 B2 * | 2/2010 | Wang et al. | 349/37 |
| 7,728,939 B2 * | 6/2010 | Tsai et al. | 349/129 |
| 7,808,565 B2 * | 10/2010 | Wang et al. | 349/37 |
| 7,973,897 B2 * | 7/2011 | Wang et al. | 349/139 |
| 2002/0047822 A1 | 4/2002 | Senda et al. | |
| 2004/0041770 A1 | 3/2004 | Kubo et al. | |
| 2004/0201807 A1 | 10/2004 | Ong | |
| 2004/0210807 A1 | 10/2004 | Sweet et al. | |
| 2005/0046774 A1 | 3/2005 | Choi et al. | |
| 2005/0128399 A1 | 6/2005 | Kim et al. | |
| 2005/0200588 A1 * | 9/2005 | Kaneda | 345/98 |
| 2007/0229430 A1 | 10/2007 | Wang et al. | |

FOREIGN PATENT DOCUMENTS

| | | | |
|---|---|---|---|
| JP | 2000-241830 A | 9/2000 | |
| JP | 2004-118048 A | 4/2004 | |

* cited by examiner

*Primary Examiner* — Uyen Chau N Le
*Assistant Examiner* — Michael Mooney
(74) *Attorney, Agent, or Firm* — Muncy, Geissler, Olds & Lowe, PLLC (57) ABSTRACT

A multi-domain liquid crystal display (LCD) includes multiple effective pixel electrodes, dummy pixel electrodes and auxiliary electrodes. The effective pixel electrodes are regularly arranged in an array of row and column, and the array of effective pixel electrodes constitute an active display area of the multi-domain LCD. The dummy pixel electrodes are provided outside the active display area and arranged at least on the side of an outermost row or outermost column of the array of effective pixel electrodes. Each auxiliary electrode is positioned next to one side of an effective pixel electrode or a dummy pixel electrode to produce fringe fields and is connected to another effective pixel electrode controlled by a preceding or a succeeding signal line to allow all effective pixel electrodes to have substantially the same coupling capacitance.

20 Claims, 14 Drawing Sheets

MULTI-DOMAIN LIQUID CRYSTAL DISPLAY

CROSS REFERENCE TO RELATED APPLICATION

This application claims priority of application No. 096134785 filed in Taiwan R.O.C on Sep. 19, 2007 under 35 U.S.C. §119; the entire contents of which are hereby incorporated by reference.

BACKGROUND OF THE INVENTION

1. Field of the Invention

The invention relates to a multi-domain liquid crystal display having excellent luminous uniformity.

2. Description of the Related Art

Typically, the display contrast ratio and response speed offered by a VA (vertically-aligned) mode liquid crystal display, which uses negative liquid crystal materials and vertical alignment films, are better than a TN (twisted-nematic) mode LCD, since liquid crystal molecules are aligned in a vertical direction when no voltage is applied. Also, it is known the viewing angle performance of a VA mode LCD is improved by setting the orientation directions of the liquid crystal molecules inside each picture element to a plurality of mutually different directions; that is, forming multiple distinct domains in the liquid crystal display.

Figure 12:
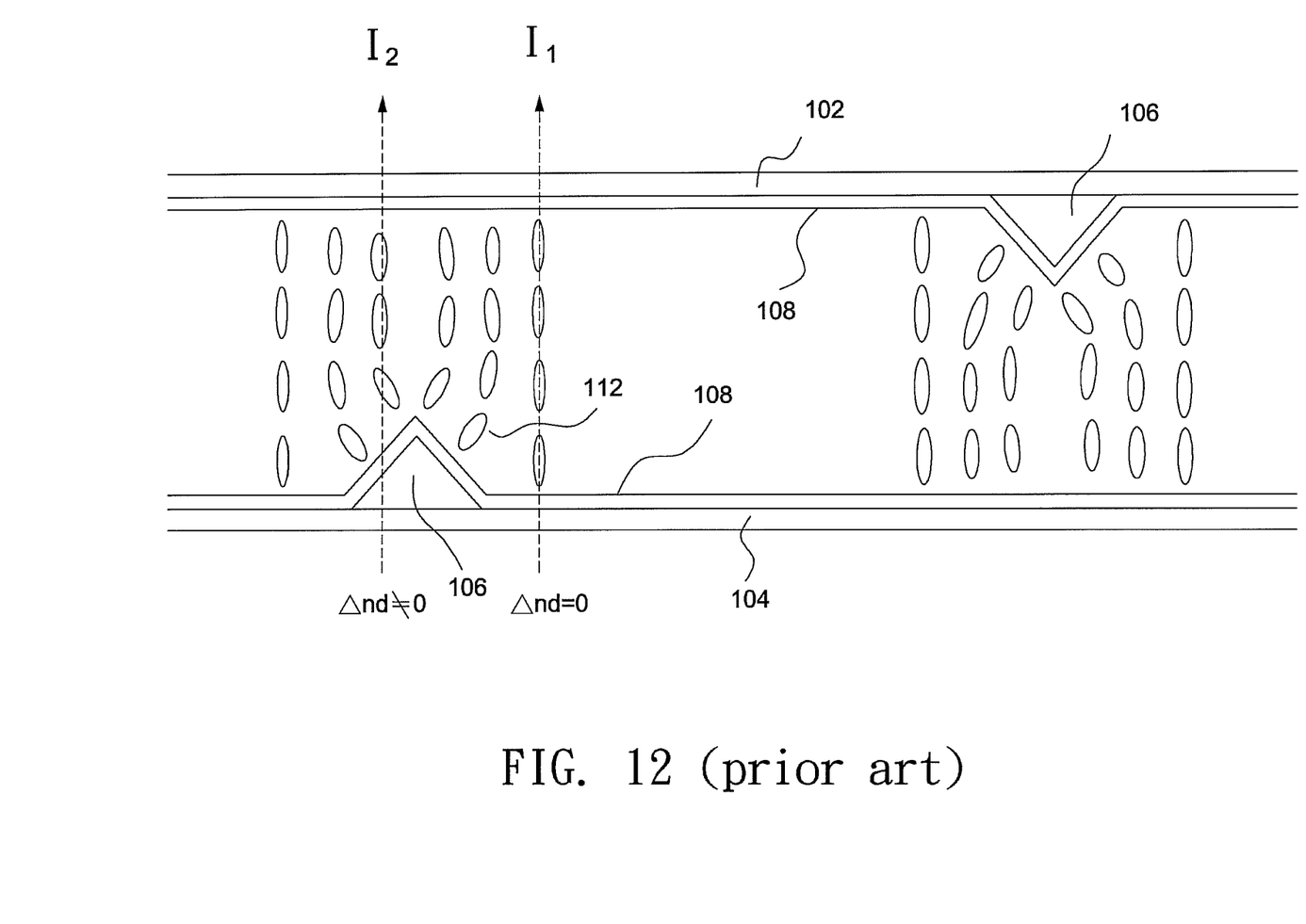
FIG. 12 shows a schematic diagram illustrating a conventional design of a multi-domain vertically aligned liquid crystal display.

FIG. 12 shows a schematic diagram illustrating a conventional design of a multi-domain vertically aligned liquid crystal display (MVA LCD). Referring to FIG. 12, a top substrate 102 and a bottom substrate 104 are both provided with protrusions 106 having different inclined surfaces and covered by vertical alignment films 108. Hence, the liquid crystal molecules 112 near the inclined surfaces orientate vertically to the inclined surfaces to have different degrees of pre-tilt angles. In case the pre-tilt liquid crystal molecules exist, surrounding liquid crystal molecules 112 are tilted in the directions of the pre-tilt liquid crystal molecules 112 when a voltage is applied. Thus, multiple domains each having individual orientation direction of liquid crystal molecules 112 are formed. Besides, the domain-regulating structure for providing inclined surfaces includes, but is not limited to, the protrusions 106, and other structure such as a concave structure 114 shown in FIG. 13 may also be used.

Figure 13:
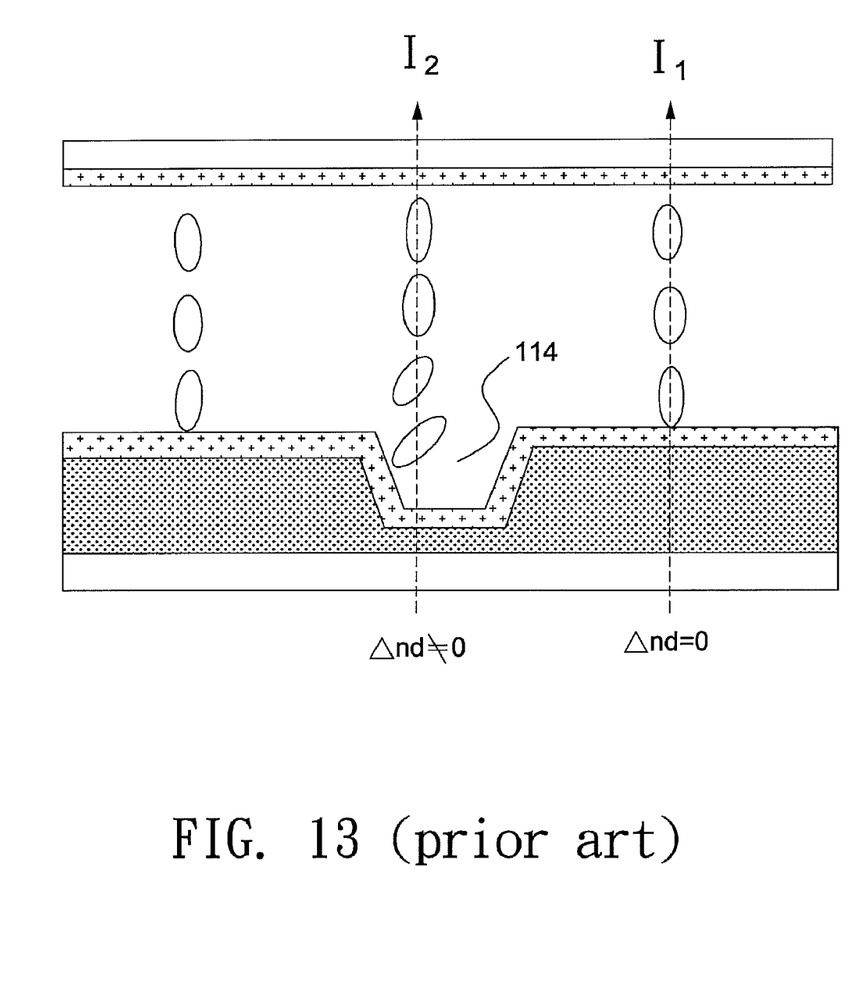
FIG. 13 shows a schematic diagram illustrating another conventional design of a multi-domain vertically aligned liquid crystal display.

However, when one compares the optical path of light I1 and that of light I2 shown both in FIGS. 12 and 13, it is clearly found the tilted liquid crystal molecules through which the light I2 passes under a field-off state may result in a non-zero phase difference ($\Delta nd \neq 0$) to cause light leakage. Accordingly, additional compensation films must be provided to eliminate the light leakage.

Figure 14:
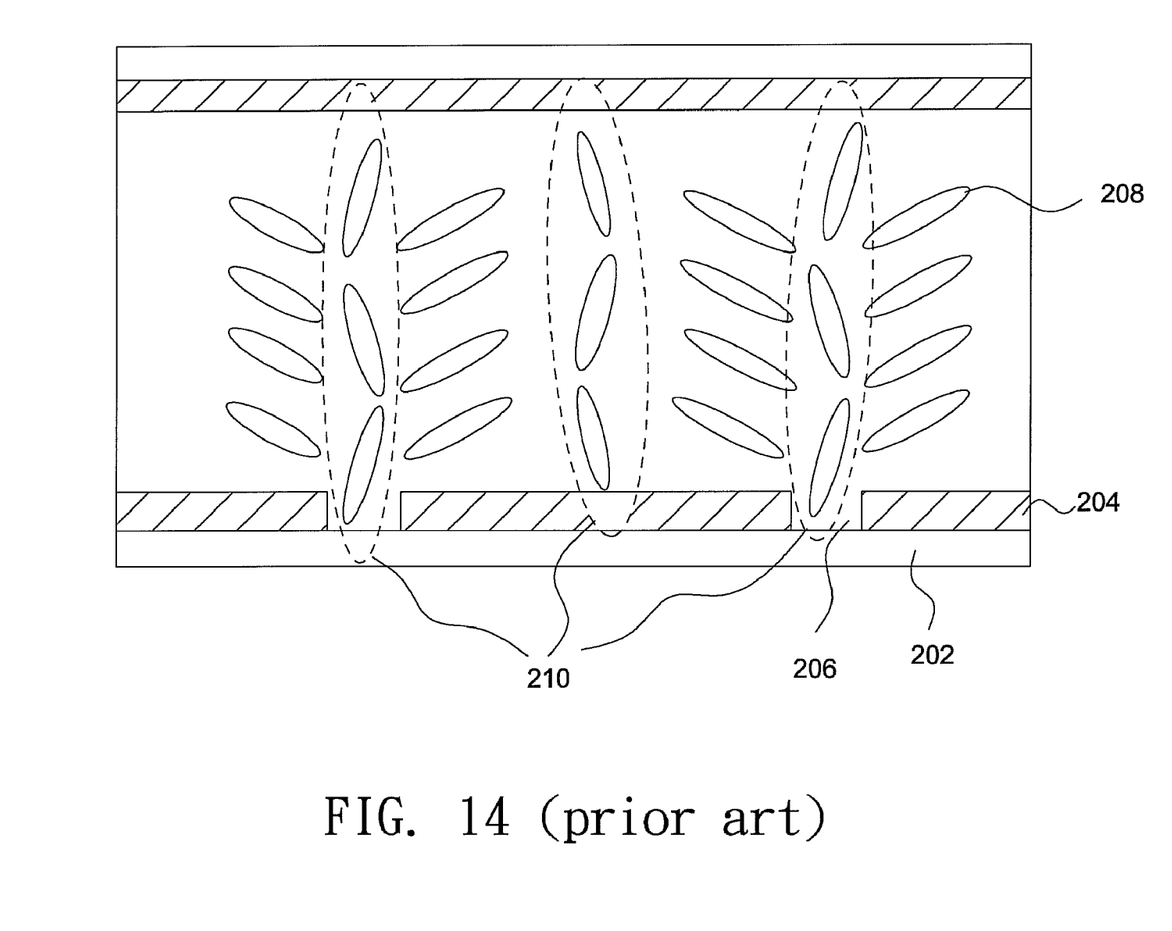
FIG. 14 shows a schematic diagram illustrating another conventional design of a multi-domain vertically aligned liquid crystal display.

FIG. 14 shows a schematic diagram illustrating another conventional design of an MVA LCD. Referring to FIG. 14, the transparent electrode 204 on the substrate 202 is provided with slits 206. Because of the fringe fields produced at edges of transparent electrode 204 and at each slit 206, the liquid crystal molecules 208 are tilted toward the center of each slit 206 to result in a multi-domain liquid crystal (LC) cell. However, the strength of the fringe fields generated by the formation of the slits 206 is often insufficient, particularly when the widths and the intervals of the slits 206 are not optimized. Besides, since the azimuth in which the liquid crystal molecules tilt due to fringe fields includes all directions of 360 degrees, a disclination region 210 often appears beyond the slits 206 or between two adjacent slits 206 to result in a reduced light transmittance.

BRIEF SUMMARY OF THE INVENTION

The invention provides a multi-domain liquid crystal display capable of solving the problems of conventional designs and having excellent luminous uniformity.

According to an embodiment of the invention, a multi-domain liquid crystal display (LCD) includes multiple effective pixel electrodes, dummy pixel electrodes and auxiliary electrodes. The effective pixel electrodes are regularly arranged in an array of row and column, and the array of effective pixel electrodes constitute an active display area of the multi-domain LCD. The dummy pixel electrodes are provided outside the active display area and arranged at least on the side of an outermost row or outermost column of the array of effective pixel electrodes. Each auxiliary electrode is positioned next to one side of an effective pixel electrode or a dummy pixel electrode to produce fringe fields and is connected to another effective pixel electrode controlled by a preceding or a succeeding signal line to allow all effective pixel electrodes to have substantially the same coupling capacitance.

According to another embodiment of the invention, a multi-domain liquid crystal display (LCD) includes multiple effective pixel electrodes and multiple dummy pixel electrodes. The effective pixel electrodes are regularly arranged in an array of row and column, and the array of effective pixel electrodes constitute an active display area of the multi-domain LCD. The dummy pixel electrodes are provided outside the active display area and arranged at least on the side of an outermost row or outermost column of the array of effective pixel electrodes. Each of the effective pixel electrodes has an extension part positioned next to one side of an effective pixel electrode or a dummy pixel electrode to produce fringe fields, a coupling capacitance is formed between each extension part and its neighboring effective pixel electrode or dummy pixel electrode, and the coupling capacitance for all effective pixel electrodes are substantially the same.

According to the above embodiments, a multi-domain profile of a LC cell can be easily achieved through typical TFT fabrication processes. Hence, compared with the conventional design where a protrusion or concave structure is used to cause tilted liquid crystal molecules, the residue phase difference is eliminated to avoid light leakage according to this embodiment since all liquid crystal molecules are vertically aligned under a field-off state. Further, compared with another conventional design where slits are formed to produce fringe fields, the biased auxiliary electrodes allow for stronger field strength to tilt liquid crystal molecules so as to reduce the areas of a disclination region and thus increase the light-transmittance of an LCD. Further, under the design that auxiliary electrodes are used to produce fringe fields, that dummy pixel electrodes arranged adjacent to the side of active display area and coupled to gate signals may allow each effective pixel electrode to have the same coupling capacitance, thus ensuring identical luminance for all pixels at a given gray-level.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. In this regard, directional terminology is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and variations thereof herein are used broadly and encompass direct and indirect connections, couplings, and mountings. Similarly, "adjacent to" and variations thereof herein are used broadly and encompass directly and indirectly "adjacent to". Therefore, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
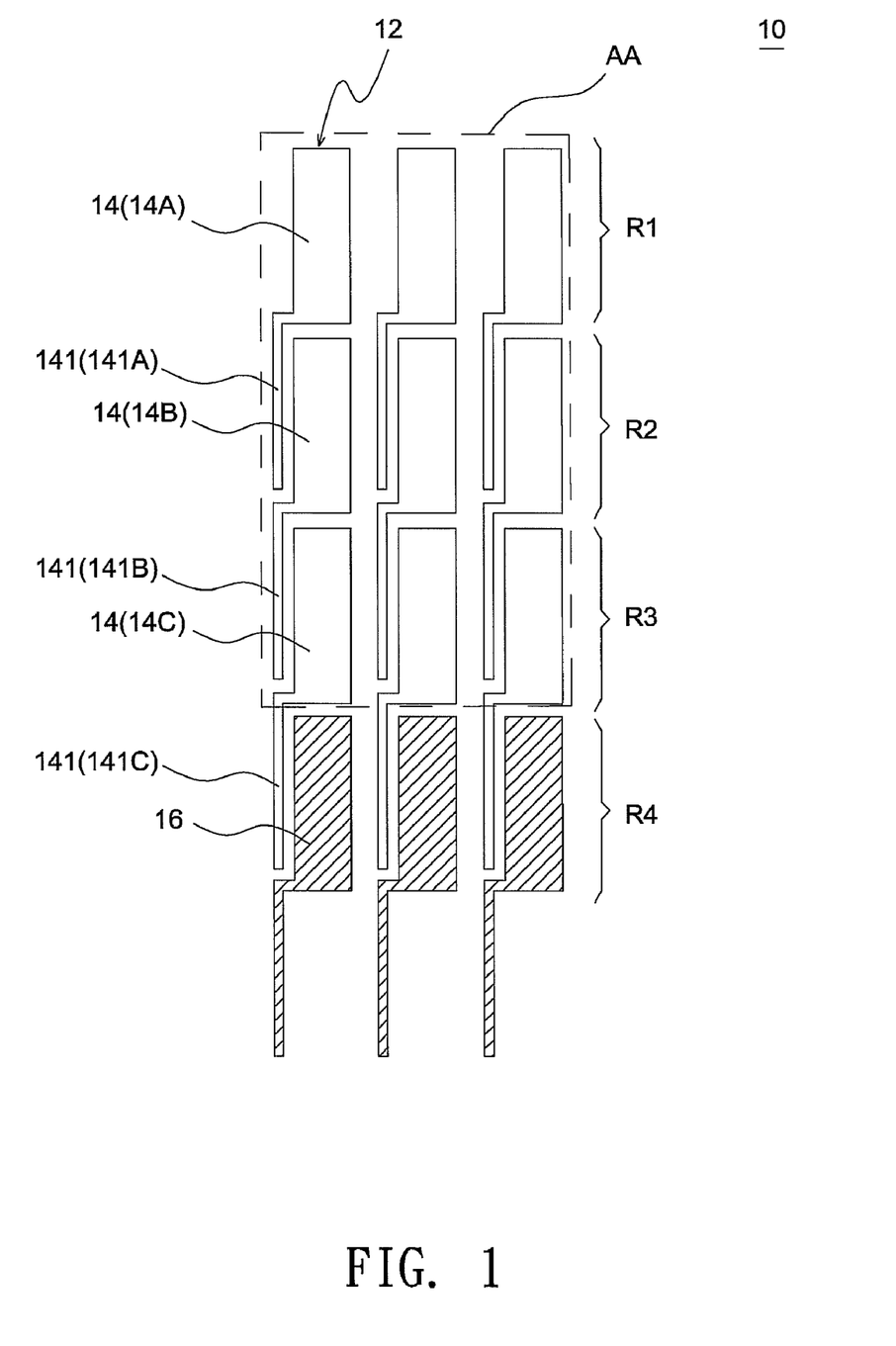
FIG. 1 shows a plane view of a multi-domain liquid crystal display according to an embodiment of the invention.

FIG. 1 shows a plane view of a multi-domain liquid crystal display (multi-domain LCD) 10 according to an embodiment of the invention. Referring to FIG. 1, the multi-domain LCD 10 includes a plurality of pixels 12, and an effective pixel electrode 14 and an auxiliary electrode 141 are provided in the distribution area of each pixel, with the effective pixel electrodes 14 being arranged regularly in an array of column and row and constituting the active display area AA of the multi-domain LCD. The array of effective pixel electrodes 14 is exemplified as having three rows R1-R3, and multiple dummy pixel electrodes 16 are arranged in a row R4 and outside the active display area AA. The row R4 of dummy pixel electrodes 16 and the bottom row R3 of effective pixel electrodes (including effective pixel electrode 14C) are placed side by side. Further, each auxiliary electrode 141 positioned next to one side of an effective pixel electrode 14 or a dummy pixel electrode 16 is connected to another effective pixel electrode 14 that is controlled by a preceding scan line. For example, an auxiliary electrode 141B positioned next to one side of an effective pixel electrode 14C is connected to another effective pixel electrode 14B that is controlled by a preceding scan line, and an auxiliary electrode 141C that is connected to the effective pixel electrode 14C is positioned next to one side of a dummy pixel electrode 16 outside the active display area AA. The auxiliary electrode 141 may be an extension part of an effective pixel electrode 14 or a separately formed electrode that is electrically connected to an effective pixel electrode 14.

According to the electrode configuration shown in FIG. 1, since each auxiliary electrode positioned next to one side of a pixel electrode is connected to another pixel electrode controlled by a preceding scan line, the auxiliary electrode 141 and its neighboring effective pixel electrode 14 have opposite polarities to produce fringe fields under an inversion drive scheme.

Further, as exemplified in FIG. 1, the active display area AA is spread with a first row R1 (including effective pixel electrode 14A), a second row R2 (including effective pixel electrode 14B), and a third row (including effective pixel electrode 14C) of effective pixel electrodes, and a fourth row R4 of dummy pixel electrodes. The dummy pixel electrodes 16 are additionally provided to equalize the coupling capacitance for different effective display electrodes 14. Specifically, since the auxiliary electrode 141A and its neighboring effective pixel electrode 14B are coupled to different data signals, a coupling capacitance Cp is formed between them to affect the luminance of the pixel electrode 14A. Similarly, the same coupling capacitance Cp is formed between the auxiliary electrode 141B and its neighboring effective pixel electrode 14C to affect the luminance of the pixel electrode 14B, and the same coupling capacitance Cp is formed between the auxiliary electrode 141C and the additionally provided dummy pixel electrode 16 that are coupled to different data signals to affect the luminance of the effective pixel electrode 14C. Hence, the effective pixel electrodes 14A, 14B and 14C may have the same luminance. In other words, if the dummy pixel electrodes 16 are not provided on the side of the active display area, the coupling capacitance Cp between the auxiliary electrode 141C and the dummy pixel electrode 16 will not be formed, and thus the luminance of the effective pixel electrode 14C is higher than that of the effective pixel electrodes 14A and 14B. In that case, a defect is shown that the bottom row R3 is brighter compared with other rows R1 and R2 of effective pixel electrodes at a given gray-level.

According to the above embodiment, a multi-domain profile of a LC cell can be easily achieved through typical TFT fabrication processes. Hence, compared with the conventional design where a protrusion or concave structure is used to cause tilted liquid crystal molecules, the residue phase difference is eliminated to avoid light leakage according to this embodiment since all liquid crystal molecules are vertically aligned under a field-off state. Further, compared with another conventional design where slits are formed to produce fringe fields, the biased auxiliary electrodes allow for stronger field strength to tilt liquid crystal molecules so as to reduce the areas of a disclination region and thus increase the light-transmittance of an LCD. Further, under the design that auxiliary electrodes 141 are used to produce fringe fields, that dummy pixel electrodes 16 arranged adjacent to the side of active display area and coupled to gate signals may allow each effective pixel electrode 14 to have the same coupling capacitance, thus ensuring identical luminance for all pixels at a given gray-level.

Figure 2:
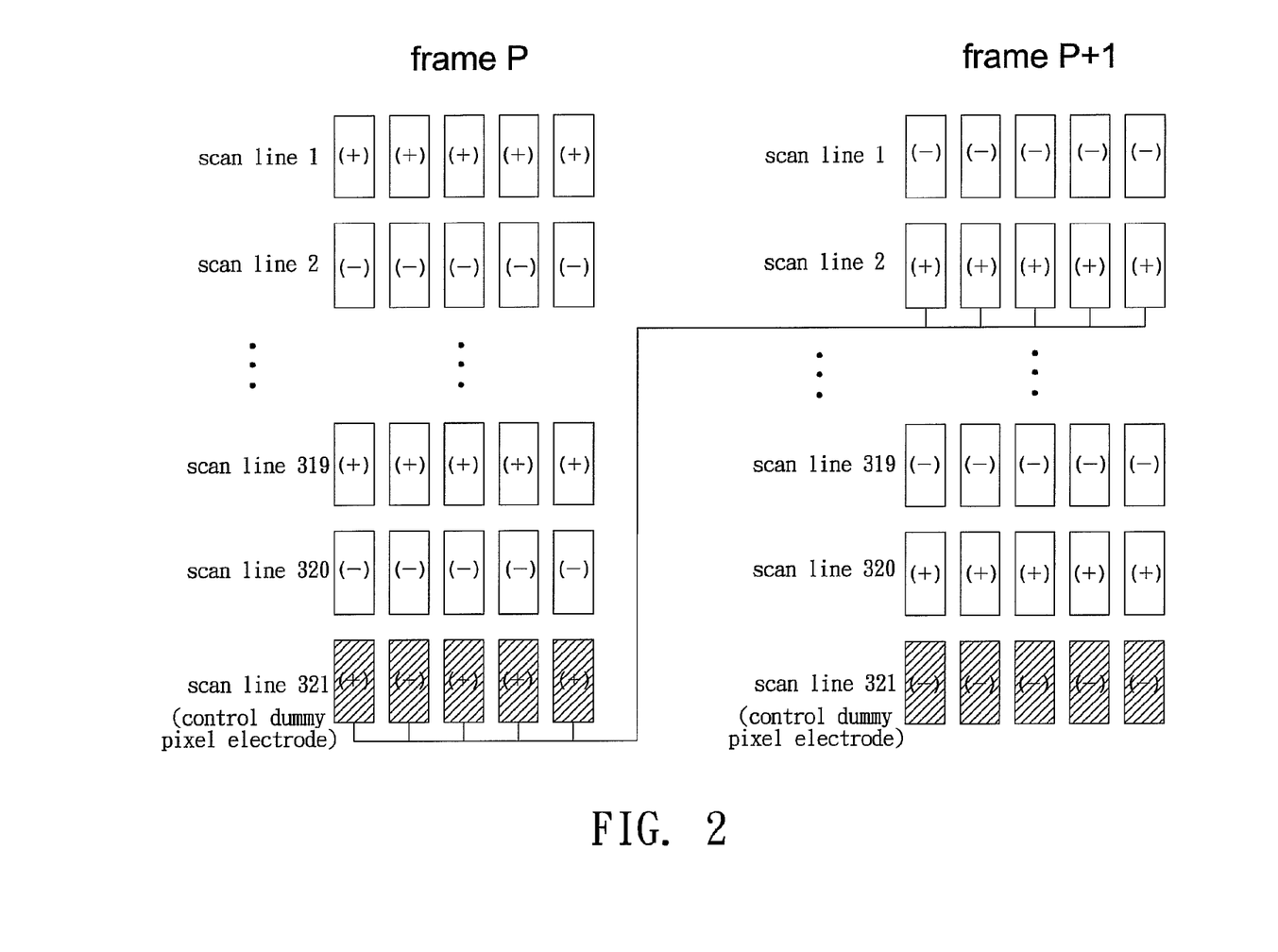
FIG. 2 shows a polarity pattern and drive architecture for the pixel layout shown in FIG. 1.
Figure 3:
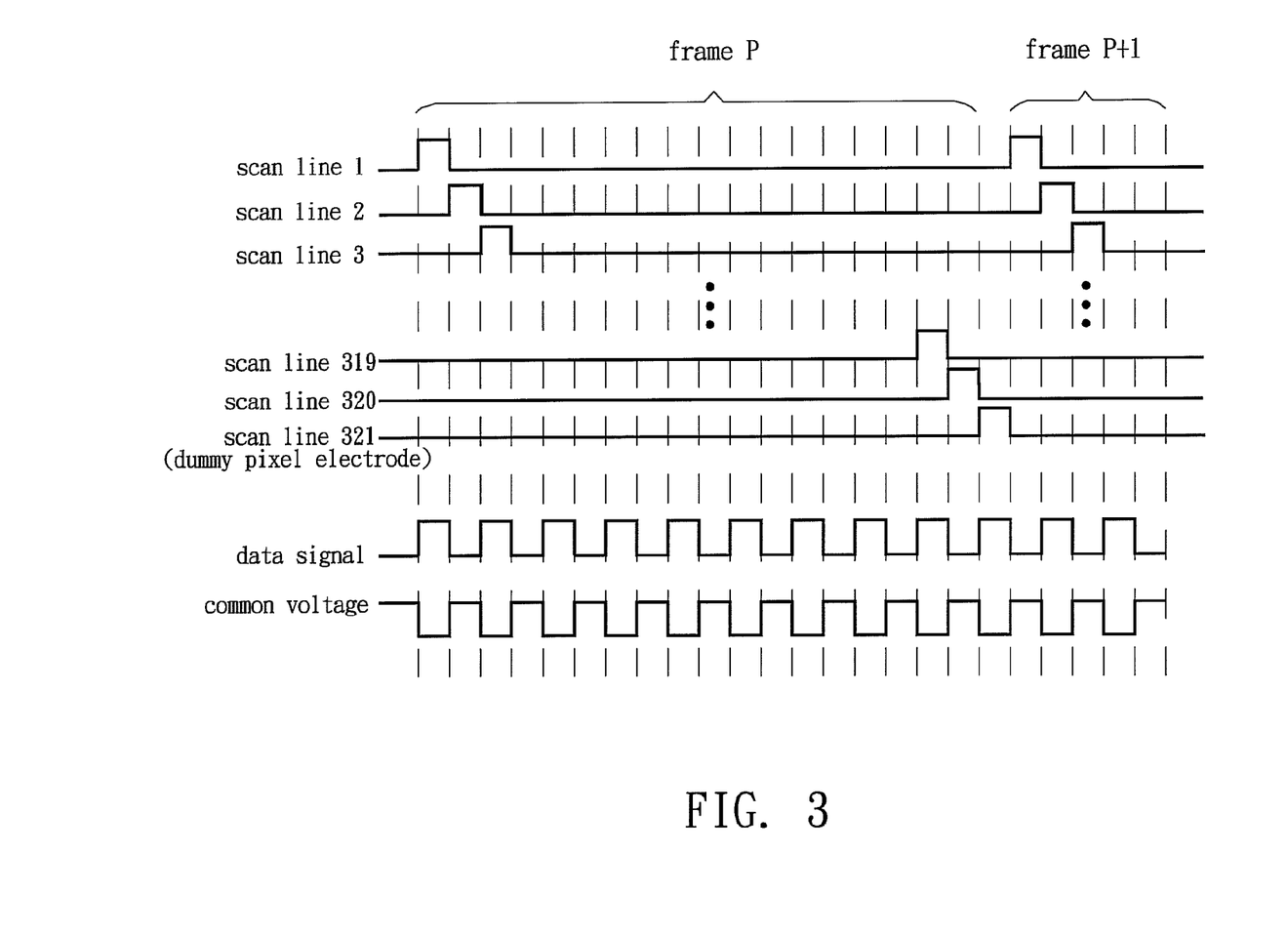
FIG. 3 shows a waveform diagram of gate signals used to drive the pixel layout where dummy pixel electrodes are provided.

FIG. 2 shows a polarity pattern and drive architecture for the pixel layout shown in FIG. 1, and FIG. 3 shows a waveform diagram of gate signals used to drive the pixel layout where dummy pixel electrodes are provided. Referring to FIG. 2, an array of effective pixel electrodes includes 320 rows that correspond to a first through a $320_{th}$ stage scan lines. A row of dummy pixel electrodes, which are placed immediately below the row of effective pixel electrodes that corresponds to the 320th stage scan line, corresponds to a $321_{th}$ stage scan line. In case a line inversion drive scheme is applied and gate signals illustrated in FIG. 3 are sequentially transmitted from the first stage scan line to the $321_{th}$ stage scan line, in a $P_{th}$ frame the effective pixel electrodes controlled by even-numbered scan lines (hereinafter briefly referred to as even-numbered electrode rows) have a negative polarity, and the effective pixel electrodes controlled by odd-numbered scan lines (hereinafter briefly referred to as odd-numbered electrode rows) and the row of dummy pixel electrodes have a positive polarity, as shown in the left side of FIG. 2. Next, in a $(P+1)_{th}$ frame the even-numbered electrode rows are reversely driven to have a positive polarity, and the odd-numbered electrode rows and the row of dummy pixel electrodes are reversely driven to have a negative polarity, as shown in the right side of FIG. 2. Since the gate signals are transmitted from top to bottom, the signal polarity of even-numbered electrode rows in the $(P+1)_{th}$ frame matches the requisite positive polarity of dummy pixel electrodes in the $P_{th}$ frame. Thus, the row of dummy pixel electrodes is connected to one of the even-numbered electrode rows through wiring, so that the scan line that corresponds to the row of dummy pixel electrodes is enabled simultaneously with one even-numbered stage scan line. Preferably, the row of dummy pixel electrodes is connected to the row of effective pixel electrodes that corresponds to a second stage scan line to avoid signal delay; that is, the scan line that corresponds to the row of dummy pixel electrodes is enabled simultaneously with the second stage scan line to avoid error operation.

Figure 4:
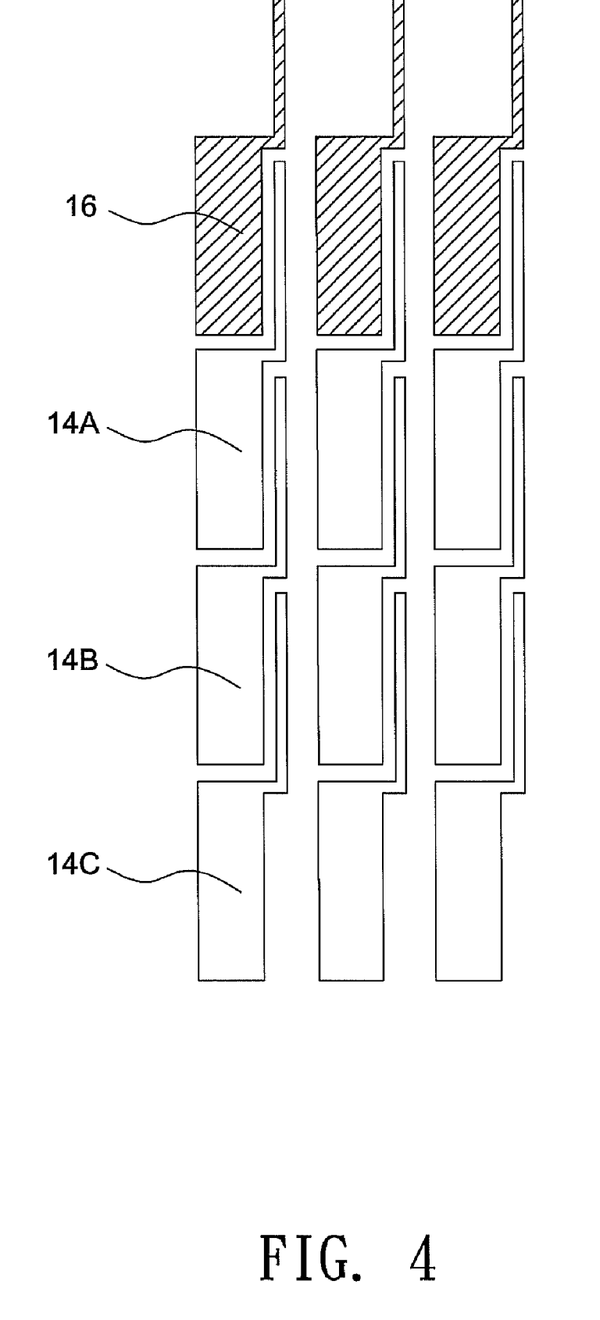
FIG. 4 shows a schematic diagram illustrating another arrangement of dummy pixel electrodes.
Figure 5:
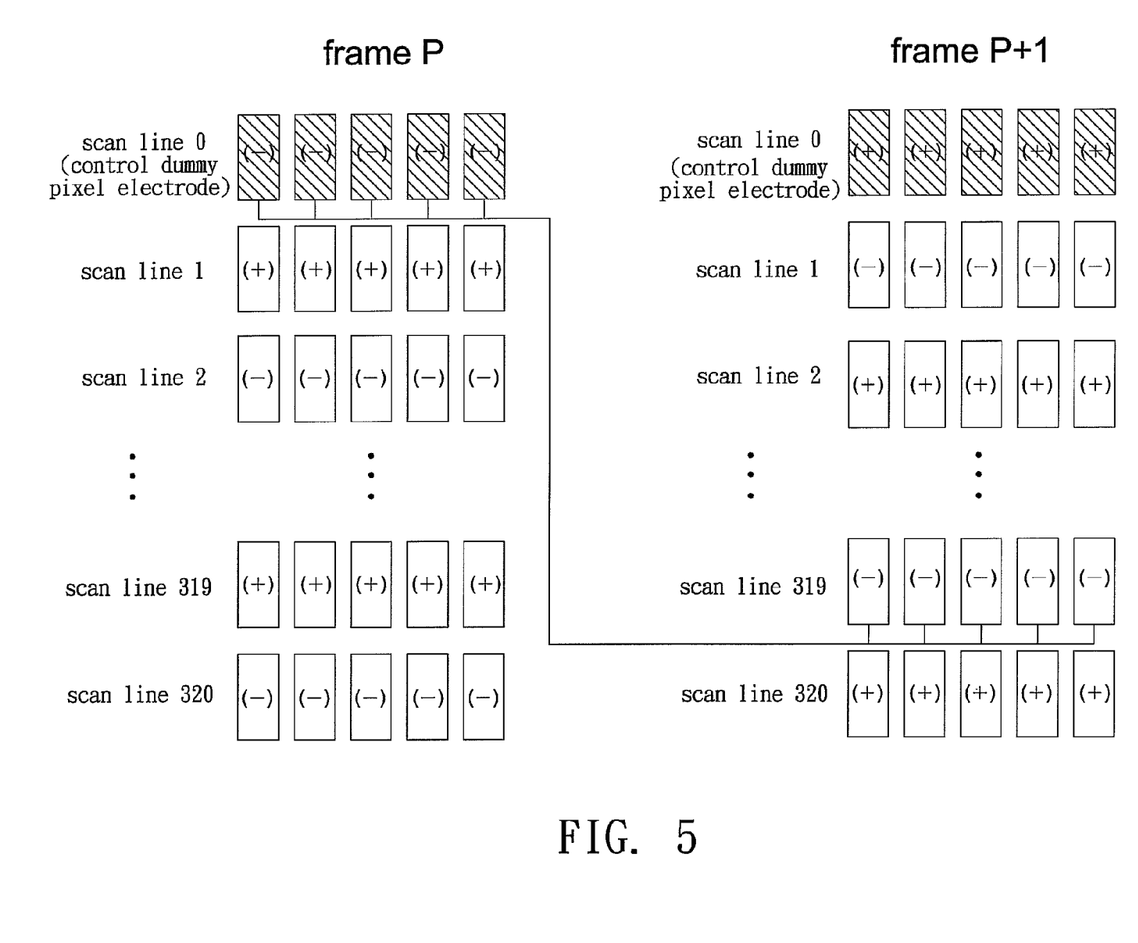
FIG. 5 shows a polarity pattern and drive architecture for the pixel layout shown in FIG. 4.

FIG. 4 shows a schematic diagram illustrating another arrangement of dummy pixel electrodes, and FIG. 5 shows a polarity pattern and drive architecture for the pixel layout shown in FIG. 4. Referring to FIG. 4, a row of dummy pixel electrodes 16 is outside the active display area AA and placed immediately above the top row of effective pixel electrodes (including effective pixel electrode 14A). All the rows of effective pixel electrodes shown in FIG. 5 correspond to, from top to bottom, first through $320_{th}$ stage scan lines, and the row of dummy pixel electrodes 16, which are placed immediately above the row of effective pixel electrodes that corresponds the first stage scan line, corresponds a $0_{th}$ stage scan line. In case a line inversion drive scheme is applied and gate signals are sequentially transmitted from the $320_{th}$ stage of scan line to the $0_{th}$ stage scan line, in a $P_{th}$ frame the odd-numbered electrode rows have a positive polarity, and the even-numbered electrode rows and the row of dummy pixel electrodes have a negative polarity, as shown in the left side of FIG. 5. Next, in a $(P+1)_{th}$ frame the odd-numbered electrode rows are reversely driven to have a negative polarity, and the even-numbered electrode rows and the row of dummy pixel electrodes are reversely driven to have a positive polarity, as shown in the right side of FIG. 5. Since the gate signals are transmitted from bottom to top, the signal polarity of odd-numbered electrode rows in $(P+1)_{th}$ frame matches the requisite negative polarity of the row of dummy pixel electrodes in $P_{th}$ frame. Thus, the row of dummy pixel electrodes is connected to one of the odd-numbered electrode rows through wiring, so that the scan line that corresponds to the row of dummy pixel electrodes is enabled simultaneously with one odd-numbered stage scan line. Preferably, the row of dummy pixel electrodes is connected to a row of effective pixel electrodes that corresponds to a $319_{th}$ stage (the second stage counted from the end) scan line to avoid signal delay; that is, the scan line that corresponds to the row of dummy pixel electrodes is enabled simultaneously with the $319_{th}$ stage scan line to avoid error operation.

Figure 6:
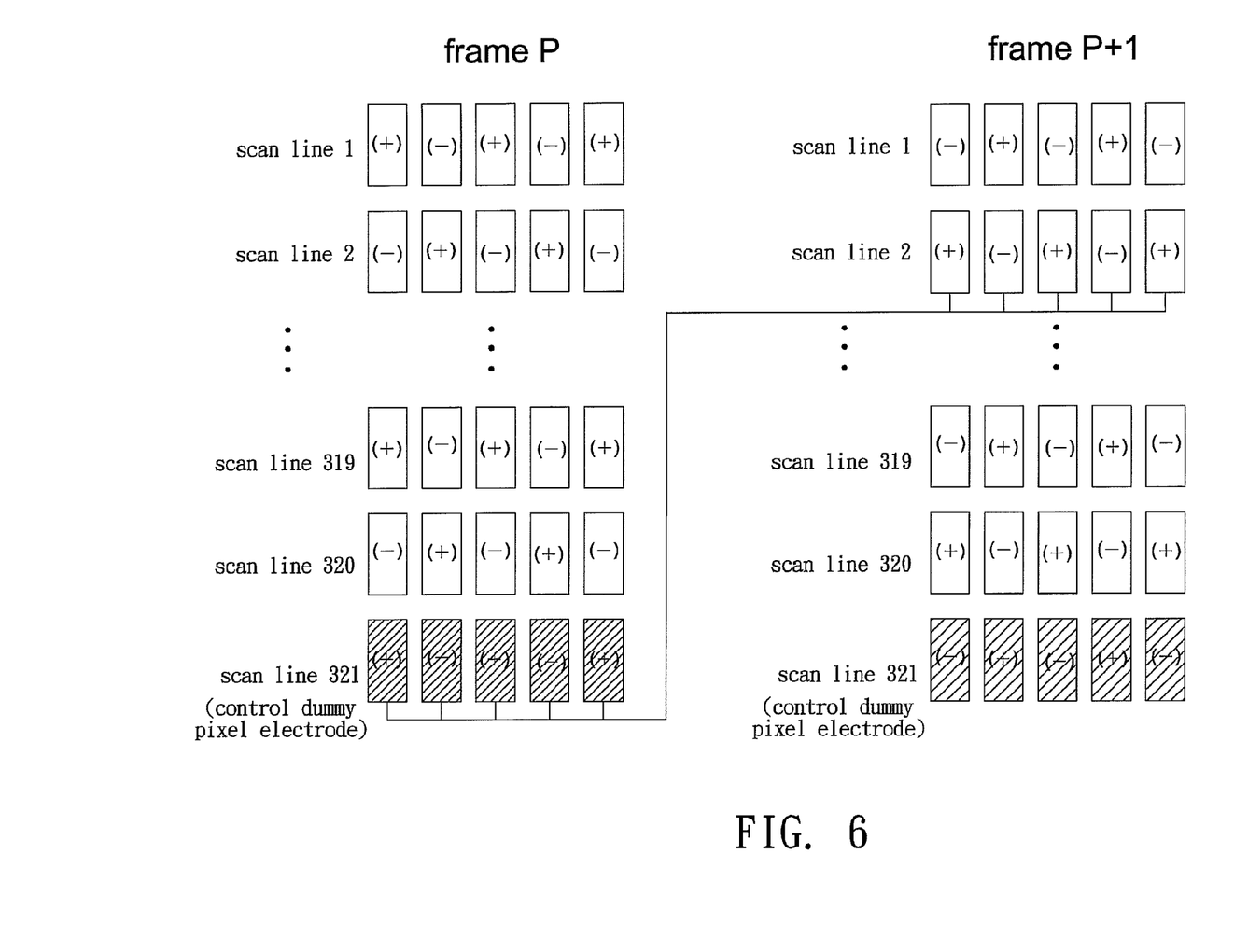
FIG. 6 shows a polarity pattern under a dot inversion drive scheme according to another embodiment of the invention.

FIG. 6 shows a polarity pattern under a dot inversion drive scheme according to another embodiment of the invention. That dummy pixel electrodes are provided to equalize the coupling capacitance for different effective pixel electrodes is suitable for any inversion drive scheme. Referring to FIG. 6, under the dot inversion drive scheme, a one-to-one inverse correspondence in polarity exists between the effective pixel electrodes in each odd-numbered row and that in neighboring even-numbered row. Hence, the signal polarity of even-numbered rows of effective pixel electrodes in $(P+1)_{th}$ frame matches the requisite signal polarity of the row of dummy pixel electrodes in $P_{th}$ frame, and thus the row of dummy pixel electrodes are connected to one of the even-numbered electrode rows through wiring, so that the scan line that corresponds to the row of dummy pixel electrodes is enabled simultaneously with one even-numbered stage scan line. Certainly, the row of dummy pixel electrodes is connected to the row of effective pixel electrodes that corresponds to a second stage scan line to avoid signal delay.

Figure 7:
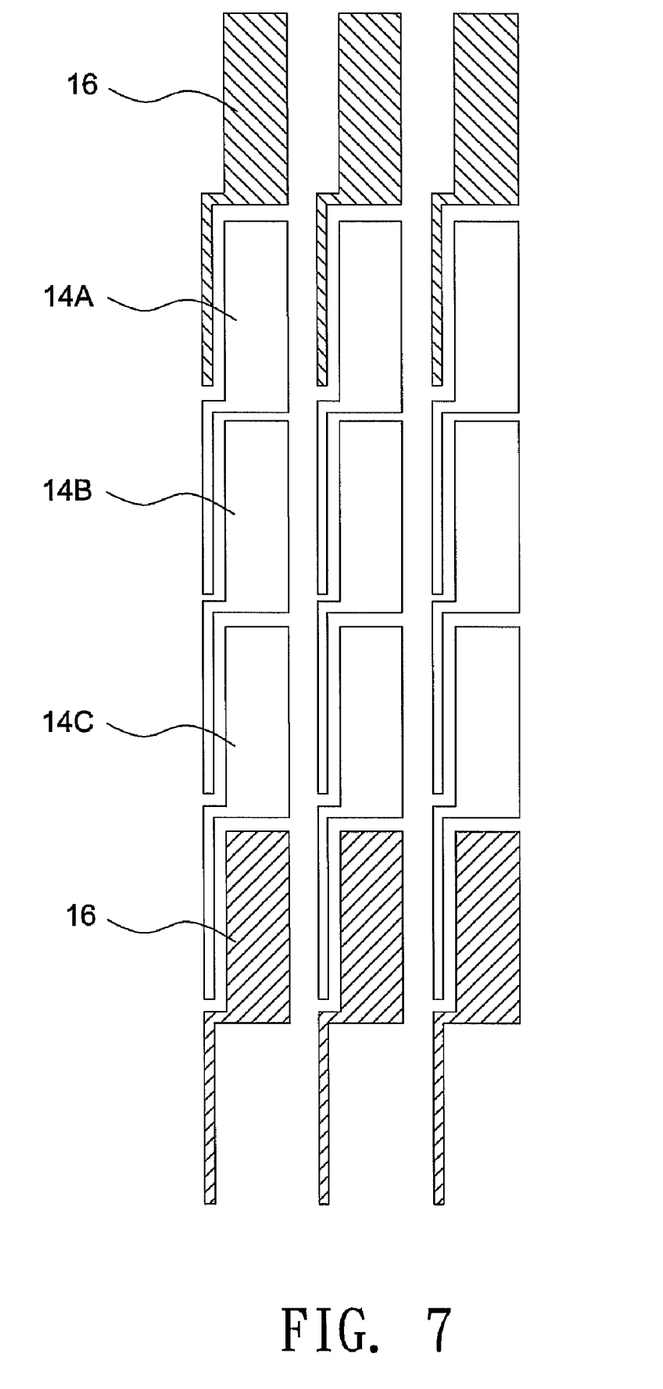
FIG. 7 shows a pixel layout according to another embodiment of the invention.

FIG. 7 shows a pixel layout according to another embodiment of the invention. According to this embodiment, the dummy pixel electrodes 16 are placed both immediately below and above an array of effective pixel electrodes to allow for more flexibility in the selection of drive schemes. Also, under the circumstance, the top row and bottom row of dummy pixel electrodes may be optionally driven according to the actual demand.

Figure 8:
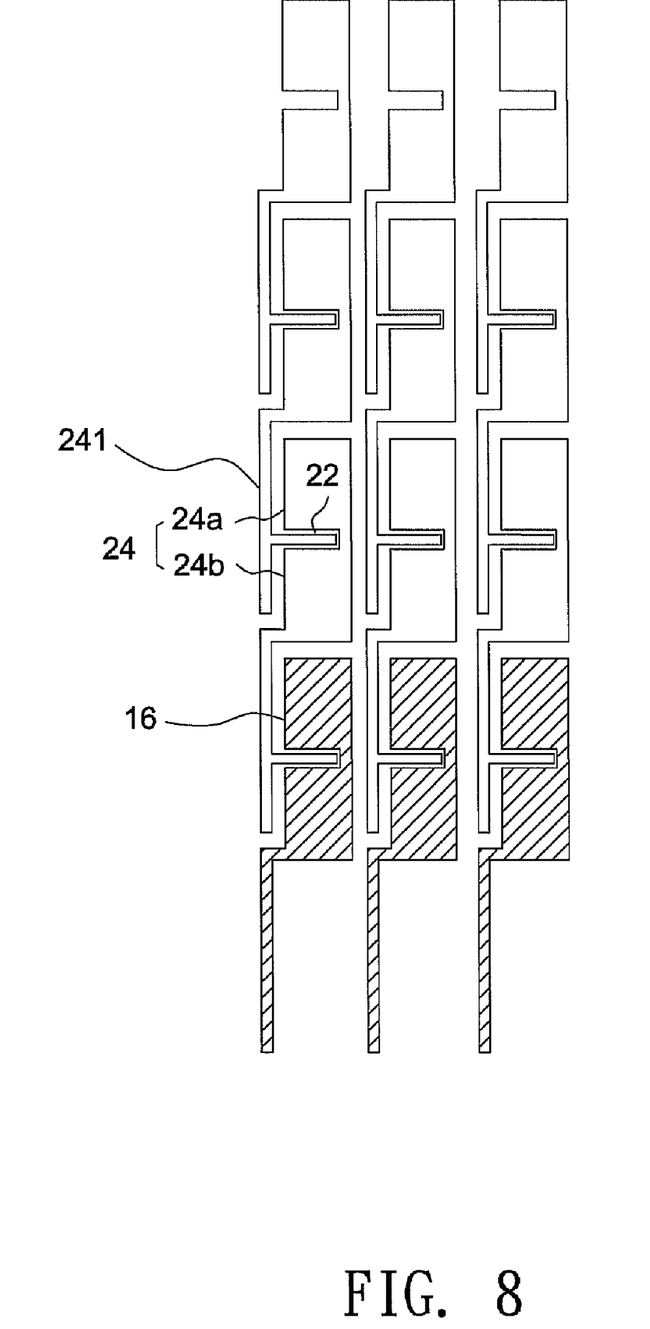
FIG. 8 shows a pixel layout according to another embodiment of the invention.

FIG. 8 shows a pixel layout according to another embodiment of the invention. Referring to FIG. 8, at least one opening 22 is formed in an effective pixel electrode 24 to divide it into two sections 24a and 24b, and an auxiliary electrode 241 extends into the opening 22 to produce fringe fields. The dummy pixel electrodes 16 are also provided adjacent to the side of the array of effective pixel electrodes to allow all effective pixel electrodes 24 to have substantially the same coupling capacitance.

Figure 9:
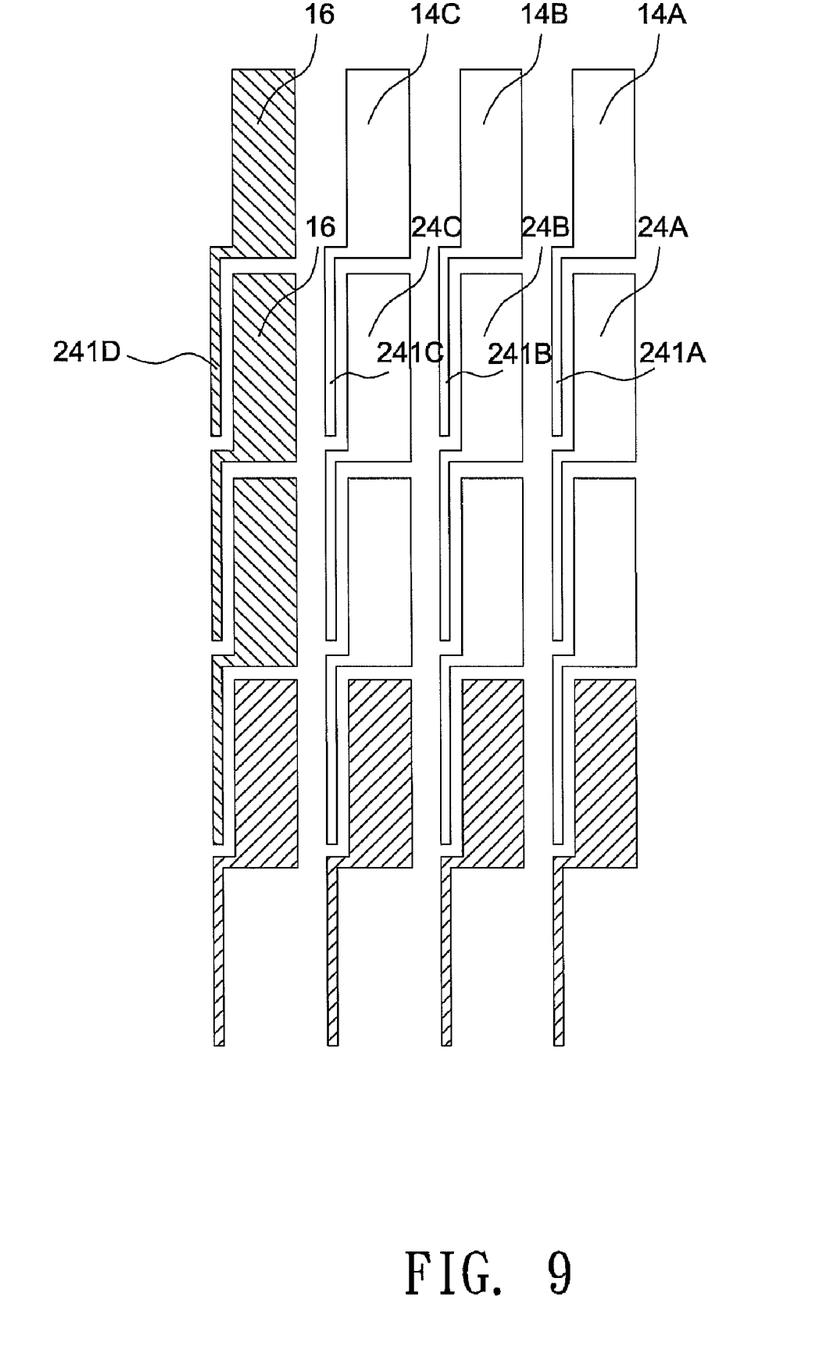
FIG. 9 shows a pixel layout according to another embodiment of the invention.
Figure 10:
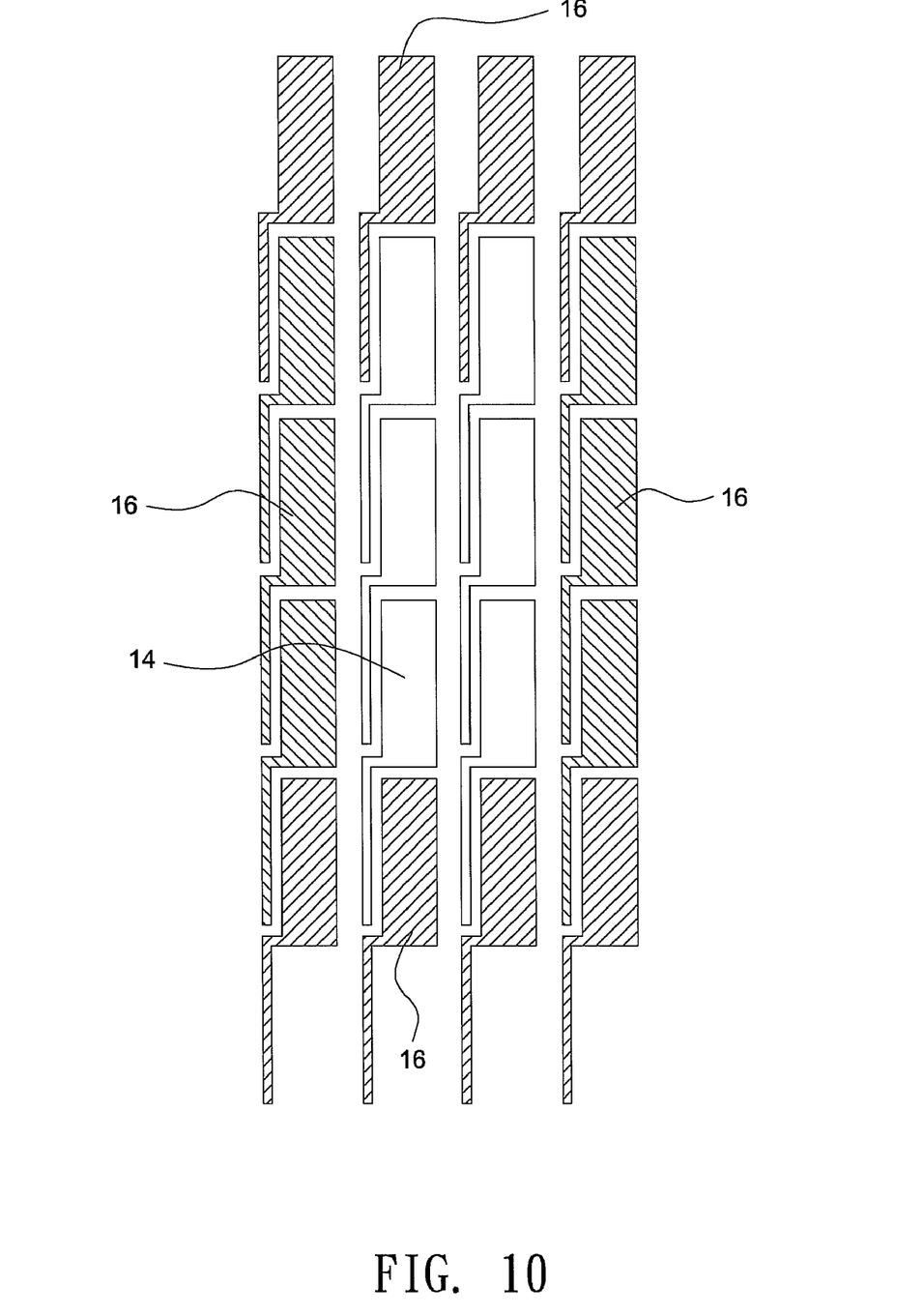
FIG. 10 shows a pixel layout according to another embodiment of the invention.

FIG. 9 shows a pixel layout according to another embodiment of the invention. Referring to FIG. 9, the array of effective pixel electrodes includes multiple columns that correspond to multiple data lines (not shown). A column of dummy pixel electrodes 16 is placed immediately on the left side of the leftmost column of effective pixel electrodes, and a row of dummy pixel electrodes 16 is placed immediately below the bottom row of effective pixel electrodes. Specifically, a first coupling capacitance Cp is formed between an auxiliary electrode 241A and an effective pixel electrode 24A, and a weaker second coupling capacitance Cp' is formed between the auxiliary electrode 241A and an effective pixel electrode 24B to affect the luminance of an effective pixel electrode 14A. Similarly, the weak second coupling capacitance Cp' is formed between the auxiliary electrode 241B and an effective pixel electrode 24C to affect the luminance of an effective pixel electrode 14B to the same extent, and the weak second coupling capacitance Cp' is also formed between the auxiliary electrode 241C and a left dummy pixel electrodes 16 to affect the luminance of an effective pixel electrode 14C to the same extent. Hence, it can be clearly seen that the dummy pixel electrodes 16 provide on the left side or right side of an array of effective pixel electrodes may avoid uneven luminance caused by the second coupling capacitance Cp', thus ensuring identical luminance at a given gray-level for all effective pixel electrodes. Besides, as shown in FIG. 10, the dummy pixel electrodes 16, arranged into four lines, may be provide on the left side, right side, top side, and bottom side of an array of effective pixel electrodes, and one or more lines of dummy pixel electrodes 16 is optionally driven according to the actual demand.

Figure 11:
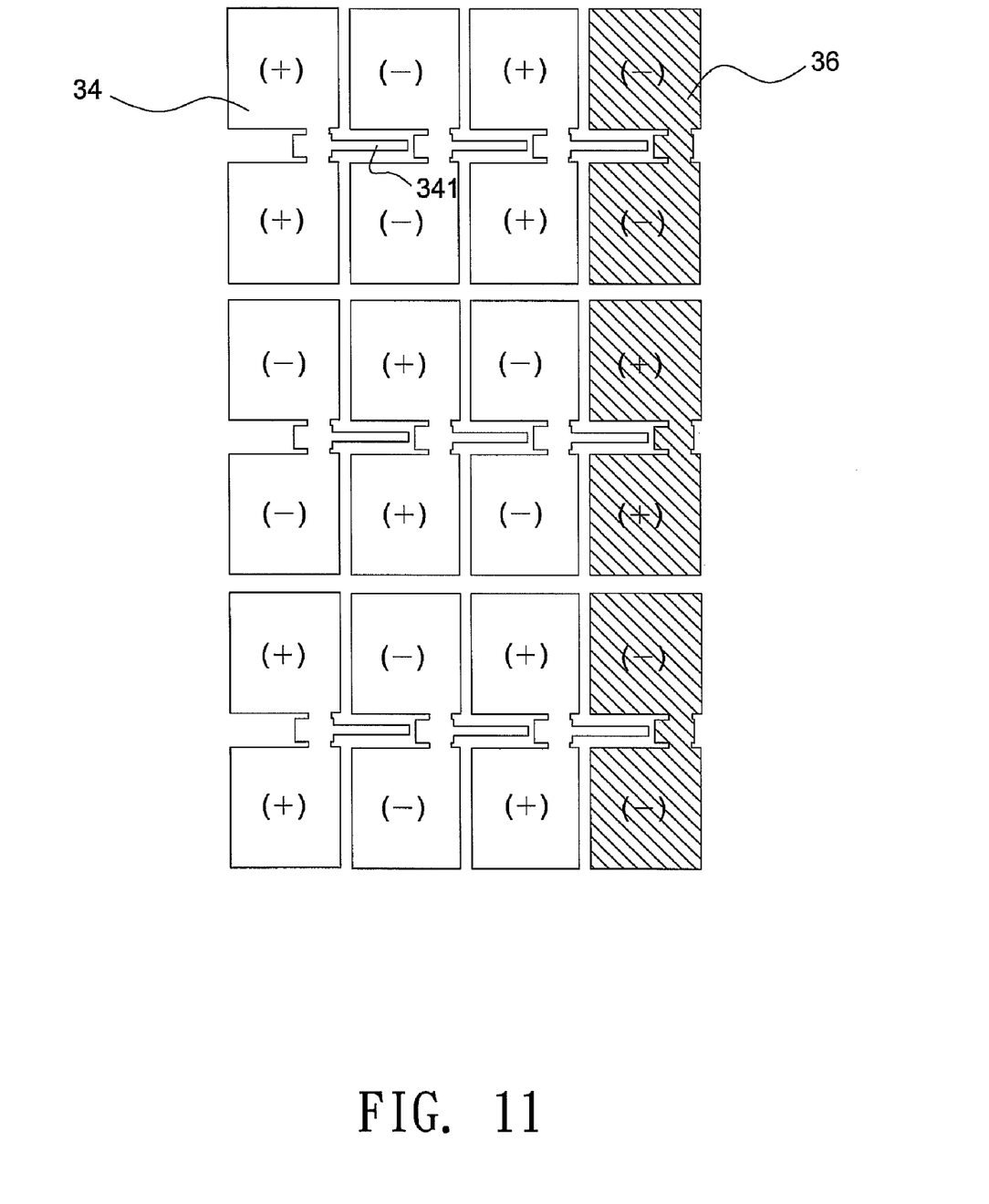
FIG. 11 shows a pixel layout and a polarity pattern under a dot inversion drive scheme according to another embodiment of the invention.

FIG. 11 shows a pixel layout and a polarity pattern under a dot inversion drive scheme according to another embodiment of the invention. Referring to FIG. 11, an auxiliary electrode 341 is a single traverse section that horizontally extends from the center portion of an effective pixel electrode 34, and the auxiliary electrode 341 has an opposite polarity in relation to its neighboring electrodes to produce fringe fields. Since all auxiliary electrodes 341 extend toward the right-hand side in this embodiment, the dummy pixel electrodes 36 are provided immediately on the right side of the rightmost column of effective pixel electrodes 34, so that the coupling capacitance for the rightmost column of effective pixel electrodes 34 is substantially the same as other columns of effective pixel electrodes 34, thus ensuring identical luminance at a given gray-level for all effective pixel electrodes in the active display area AA.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A multi-domain liquid crystal display (LCD), comprising:
a plurality of effective pixel electrodes regularly arranged in an array of row and column, the array of effective pixel electrodes constituting an active display area of the multi-domain LCD;
a plurality of dummy pixel electrodes provided outside the active display area and arranged at least on the side of an outermost row or outermost column of the array of effective pixel electrodes; and
a plurality of auxiliary electrodes, each auxiliary electrode being positioned next to one side of an effective pixel electrode or a dummy pixel electrode to produce fringe fields and being connected to another effective pixel electrode controlled by a preceding or a succeeding signal line to allow all effective pixel electrodes to have substantially the same coupling capacitance.

2. The multi-domain LCD as claimed in claim 1, wherein the array of effective pixel electrodes comprises multiple rows of effective pixel electrodes that, from top to bottom, correspond to a first through an $N_{th}$ (N is a positive integer; N>1) stage scan lines.

3. The multi-domain LCD as claimed in claim 2, wherein the dummy pixel electrodes are placed immediately below the row of effective pixel electrodes that corresponds to the $N_{th}$ stage scan line, and the dummy pixel electrodes correspond to a $(N+1)_{th}$ stage scan line.

4. The multi-domain LCD as claimed in claim 3, wherein gate signals are sequentially transmitted from the first stage scan line to the $(N+1)_{th}$ stage scan line, and the $(N+1)_{th}$ stage scan line is enabled simultaneously with one even-numbered stage scan line of the first through the $N_{th}$ stage scan lines.

5. The multi-domain LCD as claimed in claim 3, wherein gate signals are sequentially transmitted from the first stage scan line to the $(N+1)_{th}$ stage scan line, and the $(N+1)_{th}$ stage scan line is enabled simultaneously with a second stage scan line.

6. The multi-domain LCD as claimed in claim 2, wherein the dummy pixel electrodes are placed immediately above the row of effective pixel electrodes that corresponds to the first stage scan line, and the dummy pixel electrodes correspond to a preceding stage of the first stage scan line.

7. The multi-domain LCD as claimed in claim 6, wherein gate signals are sequentially transmitted from the $N_{th}$ stage scan line to the preceding stage of the first stage scan line, and the preceding stage of the first stage scan line is enabled simultaneously with one odd-numbered stage scan line of the first through the $N_{th}$ stage scan lines.

8. The multi-domain LCD as claimed in claim 6, wherein gate signals are sequentially transmitted from the $N_{th}$ stage scan line to the preceding stage of the first stage scan line, and the preceding stage of the first stage scan line is enabled simultaneously with a preceding stage of the $N_{th}$ stage scan line.

9. The multi-domain LCD as claimed in claim 2, wherein the dummy pixel electrodes are placed both immediately below the row of effective pixel electrodes that corresponds to the $N_{th}$ stage scan line and immediately above the row of effective pixel electrodes that corresponds to the first stage scan line.

10. The multi-domain LCD as claimed in claim 1, wherein the array of effective pixel electrodes comprises multiple columns of effective pixel electrodes that, from left side to right side, correspond to a first through an $M_{th}$ (M is a positive integer; M>1) column data lines.

11. The multi-domain LCD as claimed in claim 10, wherein the dummy pixel electrodes are placed both immediately on the left side of the column of effective pixel electrodes that corresponds to the first column data line or immediately on the right side of the column of effective pixel electrodes that corresponds to the $M_{th}$ column data line.

12. The multi-domain LCD as claimed in claim 10, wherein the dummy pixel electrodes are placed both immediately on the left side of the column of effective pixel electrodes that corresponds to the first column data line and immediately on the right side of the column of effective pixel electrodes that corresponds to the $M_{th}$ column data line.

13. The multi-domain LCD as claimed in claim 1, wherein the array of effective pixel electrodes comprises multiple rows of effective pixel electrodes that correspond to a first through an $N_{th}$ (N is a positive integer; N>1) stage scan lines and multiple columns of effective pixel electrodes that correspond to a first through an $M_{th}$ (M is a positive integer; M>1) column data lines, and the dummy pixel electrodes are placed on the sides of the row of effective pixel electrodes that corresponds to the first stage scan line, the row of effective pixel electrodes that corresponds to the $N_{th}$ stage scan line, the column of effective pixel electrodes that corresponds to the first column data line, and the column of effective pixel electrodes that corresponds to the $M_{th}$ column data line.

14. The multi-domain LCD as claimed in claim 1, wherein each of the effective pixel electrodes is divides into multiple sections by at least one opening formed therein and the auxiliary electrode extends into the opening.

15. The multi-domain LCD as claimed in claim 1, wherein each of the auxiliary electrodes is connected to an effective pixel electrode controlled by a preceding or a succeeding scan line.

16. The multi-domain LCD as claimed in claim 1, wherein each of the auxiliary electrodes is connected to an effective pixel electrode controlled by a preceding or a succeeding data line.

17. A multi-domain liquid crystal display LCD, comprising:
a plurality of effective pixel electrodes regularly arranged in an array of row and column, the array of effective pixel electrodes constituting an active display area of the multi-domain LCD; and
a plurality of dummy pixel electrodes provided outside the active display area and arranged at least on the side of an outermost row or outermost column of the array of effective pixel electrodes;
wherein each of the effective pixel electrodes has an extension part positioned next to one side of an effective pixel electrode or a dummy pixel electrode to produce fringe fields, a coupling capacitance is formed between each extension part and its neighboring effective pixel electrode or dummy pixel electrode, and the coupling capacitance for all effective pixel electrodes are substantially the same.

18. The multi-domain LCD as claimed in claim 17, wherein the array of effective pixel electrodes comprises multiple rows of effective pixel electrodes that, from top to bottom, correspond to a first through an $N_{th}$ (N is a positive integer; N>1) stage scan lines.

19. The multi-domain LCD as claimed in claim 17, wherein the array of effective pixel electrodes comprises multiple columns of effective pixel electrodes that, from left side to right side, correspond to a first through an $M_{th}$ (M is a positive integer; M>1) column data lines.

20. The multi-domain LCD as claimed in claim 17, wherein each of the effective pixel electrodes is divides into multiple sections by at least one opening formed therein.

* * * * *